(12) United States Patent
Jackson et al.

(10) Patent No.: US 12,305,684 B2
(45) Date of Patent: May 20, 2025

(54) SEQUENTIAL TORQUE APPLICATION RETENTION SYSTEM

(71) Applicant: Raytheon Company, Waltham, MA (US)

(72) Inventors: William M. Jackson, Tucson, AZ (US); Raymond S. Lickson, Tucson, AZ (US)

(73) Assignee: Raytheon Company, Arlington, VA (US)

( * ) Notice: Subject to any disclaimer, the term of this patent is extended or adjusted under 35 U.S.C. 154(b) by 558 days.

(21) Appl. No.: 17/553,230

(22) Filed: Dec. 16, 2021

(65) Prior Publication Data
US 2023/0193940 A1    Jun. 22, 2023

(51) Int. Cl.
*F16B 23/00*    (2006.01)
*F16B 5/02*    (2006.01)

(52) U.S. Cl.
CPC ............ *F16B 23/0069* (2013.01); *F16B 5/02* (2013.01); *F16B 23/0023* (2013.01)

(58) Field of Classification Search
CPC .... F16B 23/0069; F16B 23/0023; F16B 5/02; F16B 23/0061; B25B 23/0035; B25B 15/001
USPC .......................................................... 81/461
See application file for complete search history.

(56) References Cited

U.S. PATENT DOCUMENTS

| 76,900 A | * | 4/1868 | Fisk | ........................ B25B 13/48 81/74 |
| 1,643,901 A | * | 9/1927 | Peterson | ............... B25B 13/065 81/124.6 |
| 3,073,206 A | | 1/1963 | Rudolph | |
| 3,106,862 A | | 10/1963 | Briles | |

(Continued)

FOREIGN PATENT DOCUMENTS

| CN | 201872141 U | 6/2011 |
| CN | 103174723 A | 6/2013 |

(Continued)

OTHER PUBLICATIONS

SR and Written Opinion dated Jan. 31, 2023 issued in corresponding International App. PCT/US2022/046647.

(Continued)

*Primary Examiner* — Hadi Shakeri
(74) *Attorney, Agent, or Firm* — Bachman & LaPointe, P.C.

(57) ABSTRACT

A sequential torque application retention system includes a driver mechanism having a shaft; a center drive coupled to a tip end; an outboard drive coupled to the tip end; a screw including a screw head with a central receiver, the central receiver corresponding to the center drive, the central receiver configured to receive the center drive; a pair of outboard receivers formed in the screw head corresponding to the outboard drive, the pair of outboard receivers configured to receive the outboard drive; wherein the center drive is engaged with the screw head at the central receiver (Continued)

responsive to an initial torque and the outboard drive is engaged with the screw head at the pair of outboard receivers responsive to a subsequent torque; and wherein the outboard receivers are positioned so that they do not engage with the outboard drive responsive to the initial torque.

15 Claims, 7 Drawing Sheets

(56) References Cited

U.S. PATENT DOCUMENTS

| | | | |
|---|---|---|---|
| 3,424,212 A * | 1/1969 | Kemper | B25B 15/02 |
| | | | 81/436 |
| 4,164,967 A | 8/1979 | Breuers | |
| 4,466,314 A | 8/1984 | Rich | |
| 4,466,315 A | 8/1984 | Boschetto, Jr. et al. | |
| 5,366,330 A | 11/1994 | Cosenza | |
| 5,520,075 A * | 5/1996 | Barmore | B25B 15/005 |
| | | | 81/437 |
| 6,077,267 A | 6/2000 | Huene | |
| 6,196,091 B1 * | 3/2001 | Khokhar | B25B 13/48 |
| | | | 81/460 |
| 6,260,451 B1 * | 7/2001 | Mirabito | B25B 13/481 |
| | | | 81/177.6 |
| 6,935,824 B2 | 8/2005 | Nowak, Jr. | |
| 6,988,432 B2 | 1/2006 | Brooks | |
| 7,197,968 B2 | 4/2007 | Bubel | |
| 7,425,112 B2 | 9/2008 | Nowak, Jr. | |
| 8,545,156 B2 | 10/2013 | Kageyama et al. | |
| 9,080,586 B2 | 7/2015 | Liu et al. | |
| 9,702,392 B2 | 7/2017 | Landsmann | |
| 10,065,293 B2 | 9/2018 | Hettich | |
| 2004/0218993 A1 | 11/2004 | Nowak, Jr. | |
| 2005/0135898 A1 | 6/2005 | Bell et al. | |
| 2005/0169729 A1 | 8/2005 | Nowak | |
| 2007/0212190 A1 | 9/2007 | Monday et al. | |
| 2010/0111641 A1 * | 5/2010 | Zoller | F16B 23/0053 |
| | | | 81/460 |
| 2012/0134765 A1 | 5/2012 | Safar | |
| 2012/0312130 A1 | 12/2012 | Bauer | |
| 2014/0140758 A1 | 5/2014 | Liu et al. | |
| 2020/0205871 A1 | 7/2020 | Seitz et al. | |
| 2021/0088067 A1 | 3/2021 | Schuster | |

FOREIGN PATENT DOCUMENTS

| | | |
|---|---|---|
| CN | 105909644 A | 8/2016 |
| CN | 207267230 U | 4/2018 |
| DE | 4036267 A1 | 5/1992 |
| DE | 10243195 A1 | 12/2003 |
| DE | 202007002800 U1 | 4/2007 |
| DE | 202013105939 U1 | 1/2014 |
| FR | 2338628 A7 | 8/1977 |
| GB | 656145 | 9/1943 |
| GB | 2082709 A | 3/1982 |
| GB | 2194827 A | 3/1988 |
| GB | 2421922 A | 7/2006 |
| KR | 20110069317 A | 6/2011 |
| TW | M589618 U | 1/2020 |
| WO | 2020130900 A1 | 6/2020 |

OTHER PUBLICATIONS

Office Action issued Jul. 31, 2023 in counterpart Taiwan Patent App. No. 111138953.

* cited by examiner

SEQUENTIAL TORQUE APPLICATION RETENTION SYSTEM

GOVERNMENT LICENSE RIGHTS

This invention was made with Government support under N00024-17-C-5420, awarded by the Naval Sea Systems Command. The Government has certain rights in this invention.

BACKGROUND

The present disclosure is directed to the improved fastener and fastener driver system.

There is widespread use of fasteners that require high torque in a small dimension. Past attempts have utilized conventional slotted screws, Philips®, Torx® and other recessed shapes, all of which tend to fail when the torqueing tool is not aligned with the central axis or oriented with respect to the head. The common failure mode is for the torqueing tool to be placed out of axial alignment with the fastener head and cam out of alignment. The past fasteners apply torque via a single drive feature aligned with the axis of the screw (TORX for instance). All torque is applied using this single feature.

What is needed is a driver system and fastener that is configured to drive torque sequentially between a center drive feature and outboard drive feature.

SUMMARY

In accordance with the present disclosure, there is provided a sequential torque application retention system comprising a driver mechanism having a shaft with a shank end and a tip end opposite the shaft end; a center drive coupled to the tip end; an outboard drive coupled to the tip end; a screw including a screw head; a central receiver formed in the screw head, the central receiver corresponding to the center drive, the central receiver configured to receive the center drive; a pair of outboard receivers formed in the screw head corresponding to the outboard drive, the pair of outboard receivers configured to receive the outboard drive; wherein the center drive is engaged with the screw head at the central receiver responsive to an initial torque and the outboard drive is engaged with the screw head at the pair of outboard receivers responsive to a subsequent torque; and wherein the outboard receivers are positioned so that they do not engage with the outboard drive responsive to the initial torque.

A further embodiment of any of the foregoing embodiments may additionally and/or alternatively include the sequential torque application retention system further comprises a socket formed in the tip end, the socket configured to receive an insertable bit wherein the insertable bit is employed as the center drive.

A further embodiment of any of the foregoing embodiments may additionally and/or alternatively include the outboard drive is configured as a pair of outboard drives set radially apart and aligned along a common radial axis of the shaft.

A further embodiment of any of the foregoing embodiments may additionally and/or alternatively include the socket is configured to receive interchangeable insertable bits having predetermined sizes and shapes to be employed with the driver mechanism.

A further embodiment of any of the foregoing embodiments may additionally and/or alternatively include each of the interchangeable insertable bits includes a length dimension and a diameter dimension, each of the length dimension and diameter dimension being determined by a predetermined initial torque value and a predetermined subsequent torque value, such that the insertable bit can deflect in a rotary fashion about the axis of the insertable bit responsive to the subsequent torque.

A further embodiment of any of the foregoing embodiments may additionally and/or alternatively include the insertable bit includes the center drive and the outboard drive.

A further embodiment of any of the foregoing embodiments may additionally and/or alternatively include the screw head includes two pairs of outboard receivers.

In accordance with the present disclosure, there is provided a sequential torque application retention system comprising a driver mechanism having a shaft with a hex shank end and a tip end opposite the hex shank end; a socket formed in the tip end, the socket configured to receive an insertable bit removably coupled to the socket via a set screw; a center drive formed by the insertable bit; an outboard drive formed in the tip end; the outboard drive including a pair of outboard drive studs set radially apart and aligned along a common radial axis of the shaft; a screw including a screw head; a central receiver formed in the screw head, the central receiver corresponding to the center drive, the central receiver configured to receive the center drive; a pair of outboard receivers formed in the screw head corresponding to the outboard drive, the pair of outboard receivers configured to receive each of the outboard drive studs; wherein the center drive is engaged with the screw head at the central receiver responsive to an initial torque and the outboard drive is engaged with the screw head at the pair of outboard receivers responsive to a subsequent torque; and wherein the outboard receivers are positioned so that they do not engage with the outboard drive responsive to the initial torque.

A further embodiment of any of the foregoing embodiments may additionally and/or alternatively include the insertable bit is employed as the center drive.

A further embodiment of any of the foregoing embodiments may additionally and/or alternatively include the socket is configured to receive interchangeable insertable bits having predetermined sizes and shapes to be employed with the driver mechanism.

A further embodiment of any of the foregoing embodiments may additionally and/or alternatively include each of the interchangeable insertable bits includes a length dimension and a diameter dimension, each of the length dimension and diameter dimension being determined by a predetermined initial torque value and predetermined subsequent torque value, such that the insertable bit can deflect via torsion about the axis of the insertable bit responsive to the subsequent torque.

A further embodiment of any of the foregoing embodiments may additionally and/or alternatively include the insertable bit includes the center drive and the outboard drive.

A further embodiment of any of the foregoing embodiments may additionally and/or alternatively include the central receiver is insertable in the screw head.

In accordance with the present disclosure, there is provided a process for fastening a screw using a sequential torque application retention system of claim 1, the process comprising inserting an insertable bit into a socket formed in the tip end, the socket configured to receive the insertable bit; applying an initial torque engaging the center drive with the screw head at the central receiver; and applying a subsequent torque engaging the outboard drive with the screw head at the pair of outboard receivers; and wherein the outboard drive is not engaged with the screw head at the pair of outboard receivers responsive to the initial torque.

A further embodiment of any of the foregoing embodiments may additionally and/or alternatively include the outboard drive is configured as a pair of outboard drives set radially apart and aligned along a common radial axis of the shaft.

A further embodiment of any of the foregoing embodiments may additionally and/or alternatively include the insertable bit is a first insertable bit having a first predetermined size and a first predetermined shape, the process further comprising removing the first insertable bit from the socket and inserting a second insertable bit having a second predetermined size and a second predetermined shape into the socket.

A further embodiment of any of the foregoing embodiments may additionally and/or alternatively include the insertable bit includes a length dimension and a diameter dimension; varying at least one of the length dimension and diameter dimension responsive to a predetermined initial torque value and a subsequent torque value; deflecting the insertable bit in torsion about the axis of the insertable bit responsive to the subsequent torque.

A further embodiment of any of the foregoing embodiments may additionally and/or alternatively include the process further comprising configuring the insertable bit interchangeable for predetermined sizes and shapes to be employed with the driver mechanism.

A further embodiment of any of the foregoing embodiments may additionally and/or alternatively include the insertable bit includes the center drive and the outboard drive.

A further embodiment of any of the foregoing embodiments may additionally and/or alternatively include the process further comprising reducing an outside diameter of the screw head while maintaining the outboard receivers.

Other details of the sequential torque application retention system are set forth in the following detailed description and the accompanying drawings wherein like reference numerals depict like elements.

DETAILED DESCRIPTION

Figure 1:
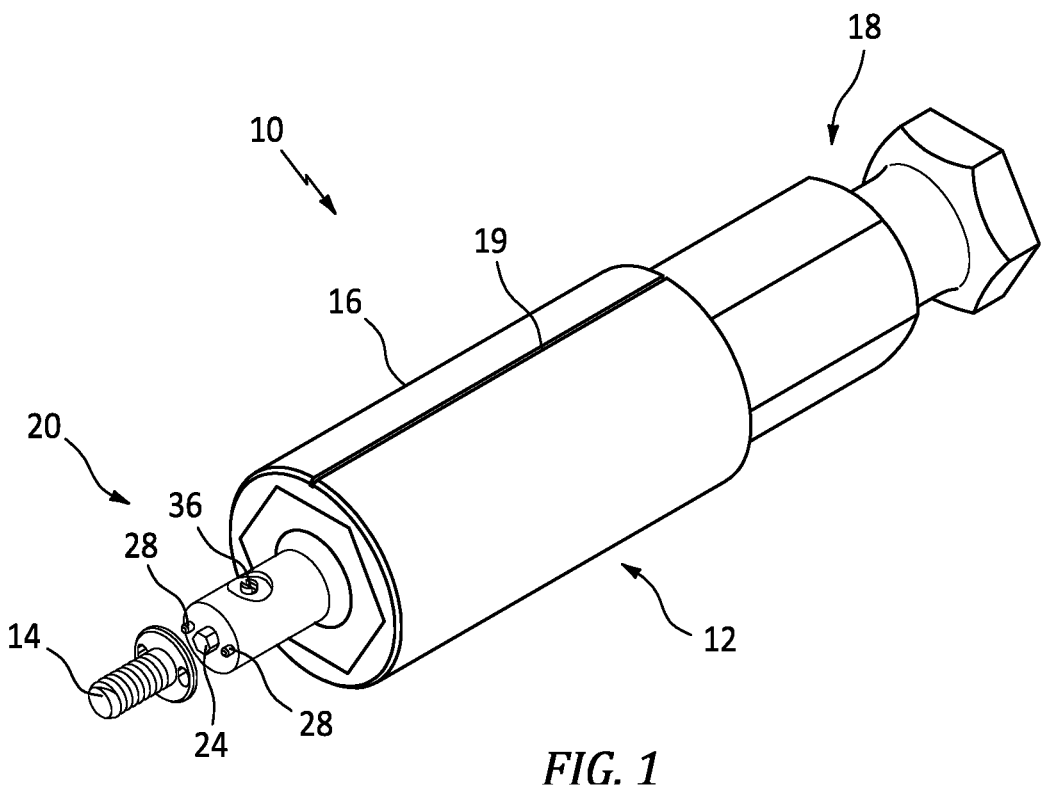
FIG. 1 is an isometric view of an exemplary driver mechanism with exemplary screw.
Figure 2:
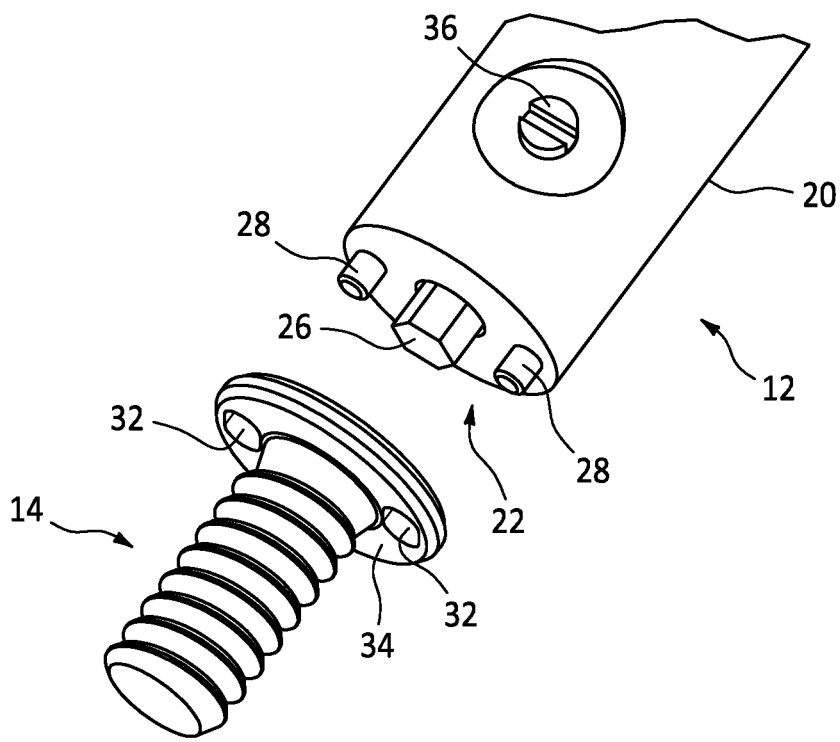
FIG. 2 is an enlarged partial view of FIG. 1.
Figure 3:
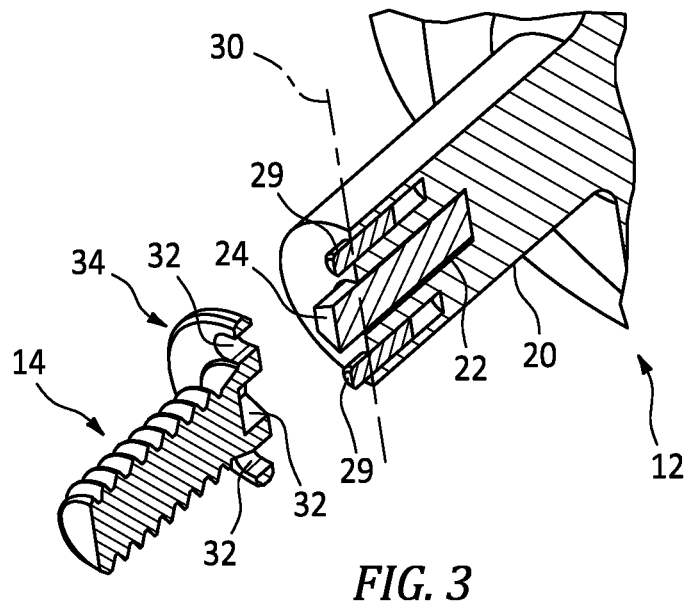
FIG. 3 is an enlarged cross-sectional partial view of FIG. 1.
Figure 4:
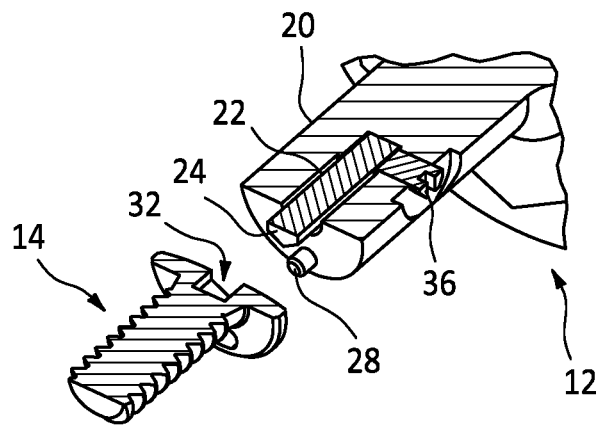
FIG. 4 is an enlarged cross-sectional partial view of FIG. 1.

Referring now to FIGS. 1-4, there is illustrated an exemplary sequential torque application retention system 10. Sequential torque application retention system 10 includes a driver mechanism 12 and screw 14. The driver mechanism 12 has a shaft 16 with a hex shank end 18 and a tip end 20 opposite the hex shank end 18. The hex shank end 18 is configured to attach with a chuck (not shown) for applying torque to the driver mechanism. An indicator 19 can be placed on the shaft 16 configured to indicate the alignment of the driver mechanism 12 relative to the screw 14. The tip end 20 includes a socket 22. The socket 22 is configured to receive an insertable bit 24. The insertable bit 24 can be employed as a center drive 26. An outboard drive 28 can be employed in addition to the center drive 26. As seen, there can be a pair of outboard drive studs 29 set radially apart. The outboard drive studs 29 can be aligned along a common diameter/radial axis 30 of the shaft 16 as seen in FIG. 3. The outboard drive studs 29 can be set into the shaft 16 tip end 20.

Figure 5:
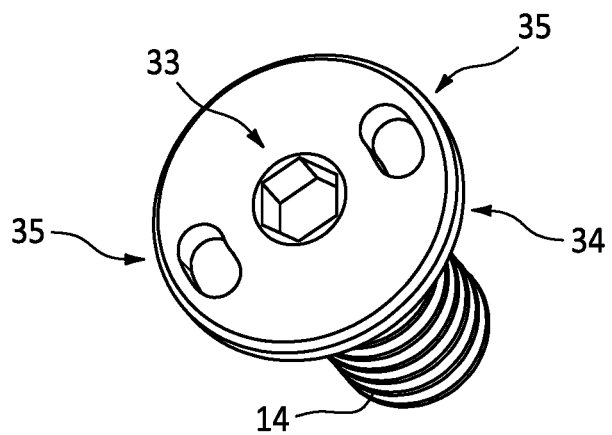
FIG. 5 is an isometric view of an exemplary screw.
Figure 6:
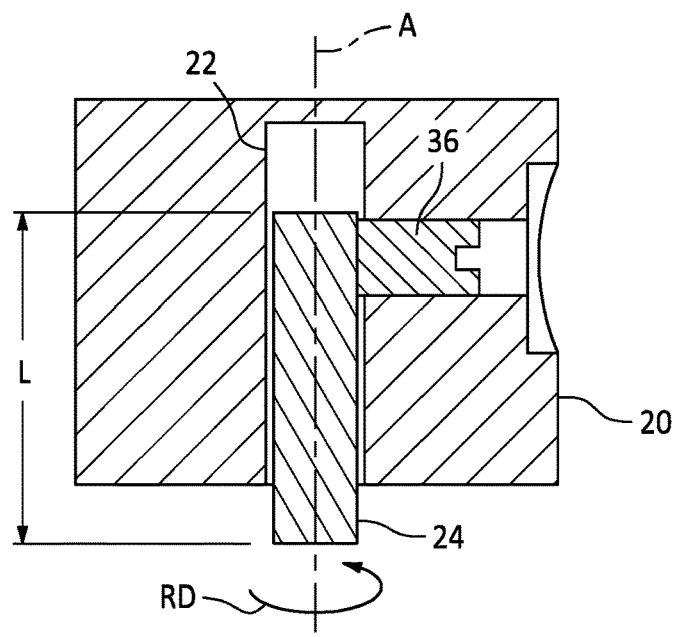
FIG. 6 is a cross-sectional partial view of an exemplary driver receiver.
Figure 7:
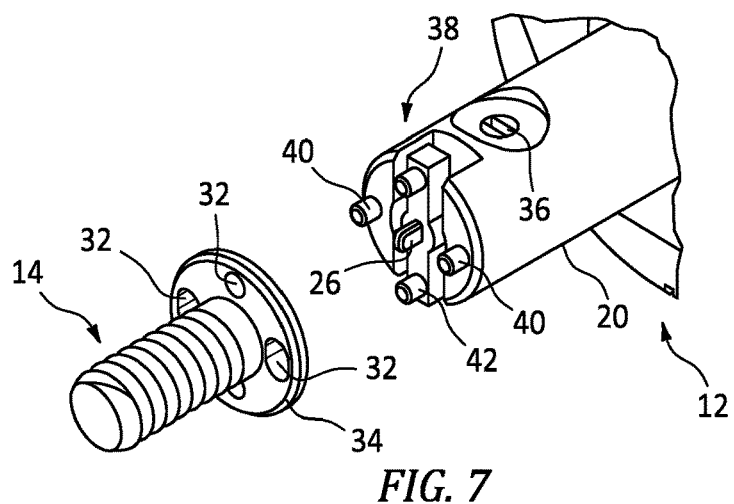
FIG. 7 is an isometric partial view of an exemplary driver mechanism with exemplary screw.
Figure 8:
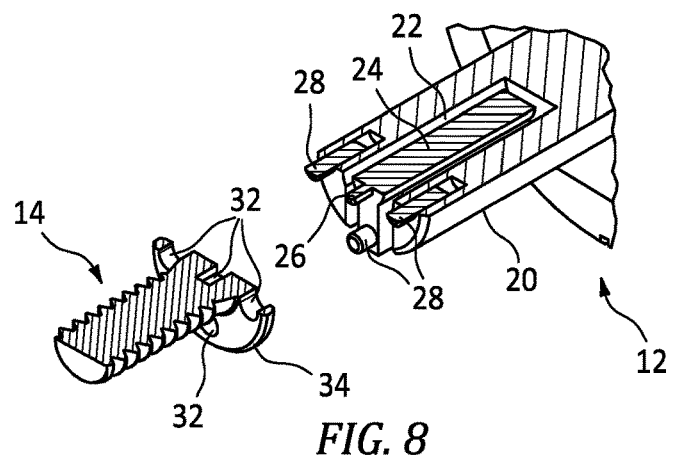
FIG. 8 is a partial cross-sectional view of FIG. 7.
Figure 9:
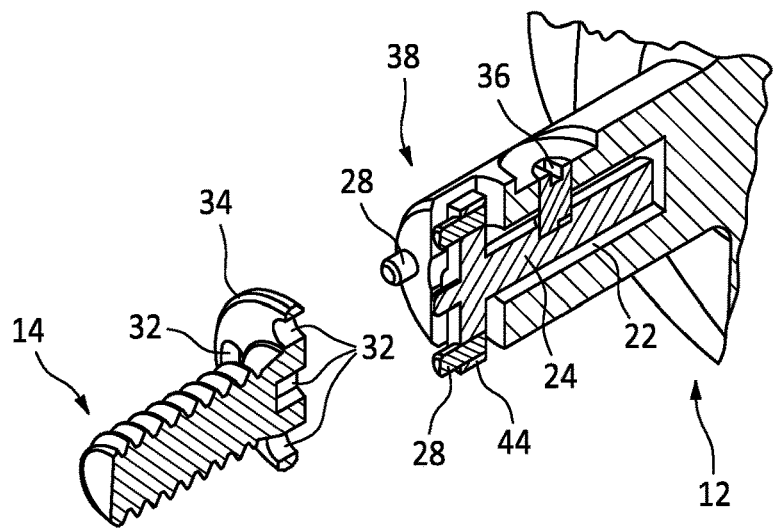
FIG. 9 is a partial cross-sectional view of FIG. 7.
Figure 10:
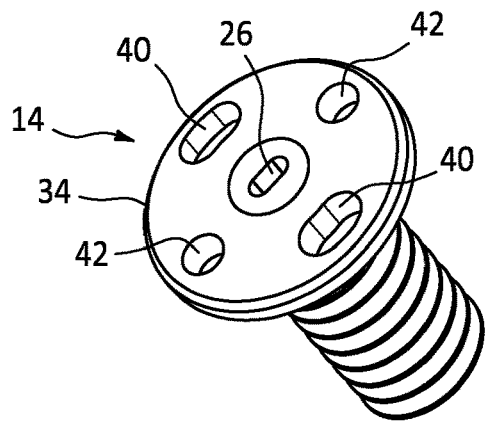
FIG. 10 is an isometric view of an exemplary screw.

Referring also to FIG. 5 and FIG. 6. The screw 14 can be configured with a corresponding shaped receiver 32 in a screw head 34. For example the screw 14 shown includes a central receiver 33 configured to match the center drive 26 and a pair of outboard receivers 35 configured to match the shaped outboard drives 28. It is contemplated that the receivers 32, 33, 35 can be shaped in a variety of designs, including slotted, hexagonal shaped, star shaped, cross shaped, square shaped, ellipse shaped, circular shaped and the like, to match the shape of the drivers 26, 28.

A set screw 36 can be threaded into the tip end 20 orthogonally oriented with respect to the insertable bit 24. The set screw 36 can adjust to secure the insertable bit 24 in the socket 22. The insertable bit 24 can be interchangeable, allowing for a variety of sizes and shapes to be employed with the driver mechanism 12.

Referring also to FIG. 6, the tip end 20 is shown in cross-section. The insertable bit 24 of the center drive 26 is held in the socket 22 by the set screw 36. The length L of the insertable bit 24 can be varied. By varying the length of the insertable bit 24 the torque value for the center drive 26 can be varied. The diameter of the insertable bit 24 can also be varied. The longer/shorter or thicker/thinner the center drive 26 the more responsive the twist or rotary deflection RD of the insertable bit 24 of the center drive 26 will be responsive to a given torque value. By varying the value of the rotary deflection RD about axis A of the insertable bit 24, the amount of torque that is applied by the center drive 26 can be varied and tailored to match screw 14 and fastening application. Rotary deflection can be understood as torsion which is the twisting of an object due to an applied torque.

The sequential torque application system 10 functions by use of the center drive 26 applying a first or initial torque value based on the length L of the bit 24. A second or subsequent torque value can be applied to the screw 14 responsive to the engagement of the outboard drive 28 against the receivers 32 in the screw head 34 engaged by the outboard drive 28. The torque applied to the screw 14 can thus be in a sequence. The center drive 26 rotates the screw 14 with the initial torque value, then as the screw 14 tightens, a second or subsequent torque value is obtained and the center drive 26 deflects. The outboard drive 28 then engages the receivers to initiate the subsequent torque on the screw head 34 and complete fastening the screw 14. The outboard drive 28 does not engage the corresponding receivers 28 during the initial torque application.

Also referring to FIGS. 7-10, an exemplary embodiment of the driver mechanism 12 can be seen. The embodiment shown includes a modified insertable bit 24. The insertable bit 24 includes both a center drive 26 and an outboard drive 28. The center drive 26 is configured as a flat head with corresponding slot in the head 34 of screw 14. It is contemplated that the outboard drive 28 can include a pair or even two pairs 38 of drivers 28. A first pair 40 of outboard drivers 28 can be attached to the tip end 20 and a second pair 42 of outboard drivers 28 can be attached to the insertable bit 24. The insertable bit 24 can include a tee portion 44 that extends radially distal from the center drive 26. The tee portion 44 can support the second pair 42 of outboard drivers 28. Including the second pair 42 of outboard drivers 28 with the insertable bit 24, allows for additional shapes and sizes to be employed providing more versatility.

Figure 11:
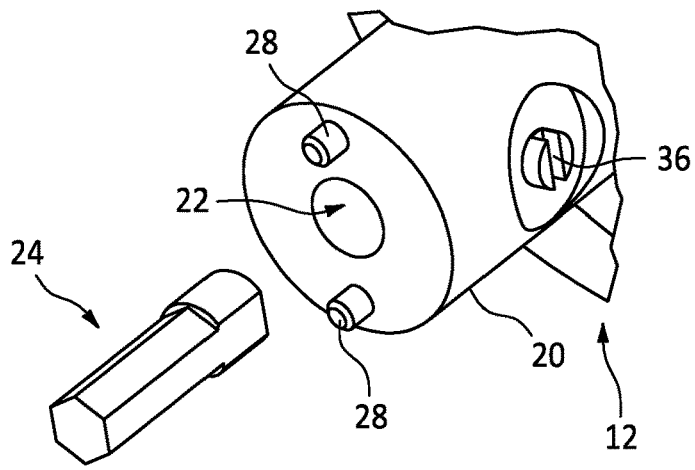
FIG. 11 is a partial view of an exemplary drive bit and driver mechanism.
Figure 12:
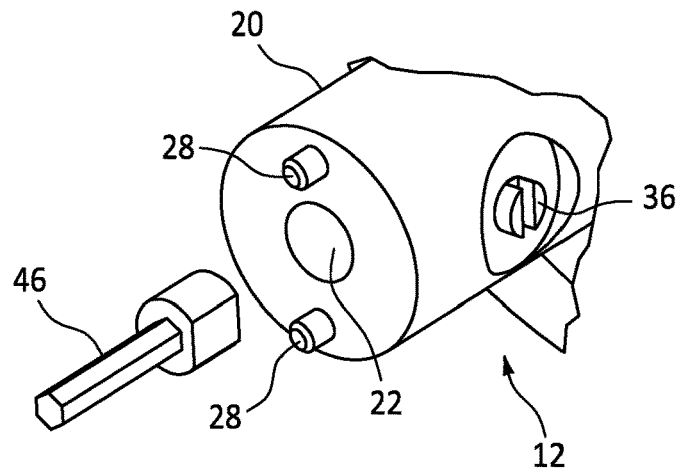
FIG. 12 is a partial view of an exemplary drive bit and driver mechanism.

Also referring to FIGS. 11 to 12 the interchangeability of the insertable bit 24 can be seen. The insertable bit 24 can be removed and exchanged with another insertable bit 46 as seen in FIG. 11 and FIG. 12. This configuration allows for a variety of sizes and styles of center drive 26 to be employed, for the same driver mechanism 12.

Figure 13:
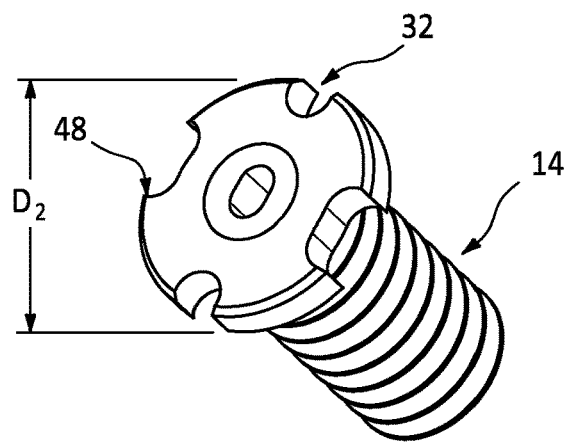
FIG. 13 is an isometric view of an exemplary screw.
Figure 14:
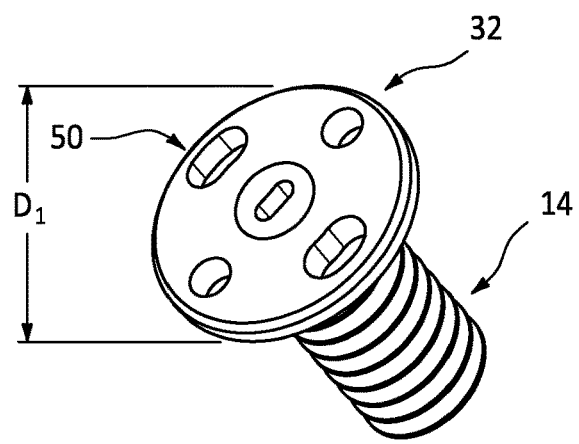
FIG. 14 is an isometric view of an exemplary screw.

Referring also, to FIG. 13 and FIG. 14, with the employment of the sequential torque application system 10, the screw head 34 can be modified. The screw head 34 in FIG. 13 has been modified as compared to the screw head 34 in FIG. 14. The diameter $D_1$ is larger than the diameter $D_2$. Because the sequential torque application system 10 can be utilized to apply torque sequentially, the receivers 32 can be engaged sequentially. The outboard drive 28 engages the corresponding receivers 32 at a point of contact 48. Thus, the outer portion 50 of the receivers 32 does not need to be retained. The reduced outer diameter $D_2$ allows for a reduction in weight and size of the screw 14, without compromising the integrity of the screw 14. It is possible to reduce the outer diameter $D_1$ responsive to stress analysis for a given screw design.

Figure 15:
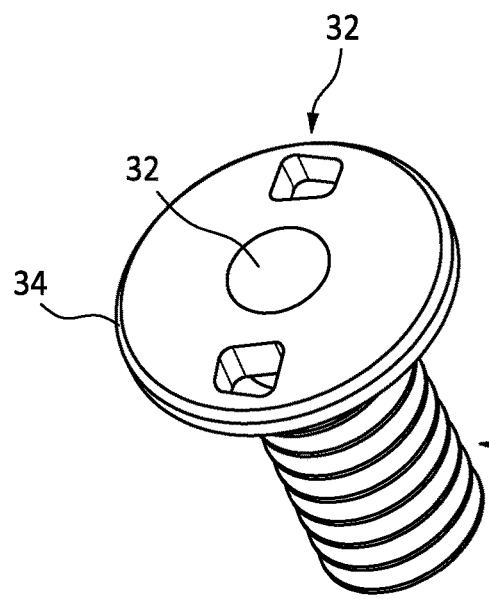
FIG. 15 is an isometric view of an exemplary screw.
Figure 16:
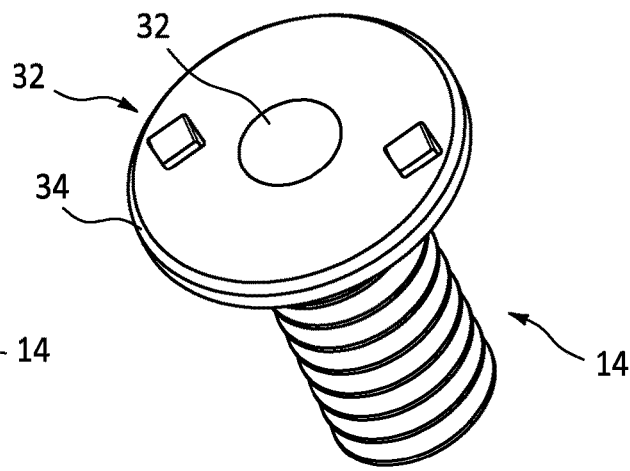
FIG. 16 is an isometric view of an exemplary screw.

Referring also to FIG. 15 and FIG. 16, exemplary screw head 34 receiver 32 designs are shown. The receivers 32 that correspond with the outboard drive 28 do not have to be limited to circular, elliptical shapes. These receivers 32 can be a variety of shapes with many other geometries utilized. In an exemplary embodiment, the receiver 32 associated with the center drive 26 can be interchangeable to alter the size of the receiver 32. The receiver 32 can be threaded to enable ease of insertion and removal. The center drive 26 can be reduced in size. Thus, the receiver 32 corresponding to the center drive 26 can be reduced in size and less material is removed from the screw head 34 providing for a stronger screw 14.

Figure 17:
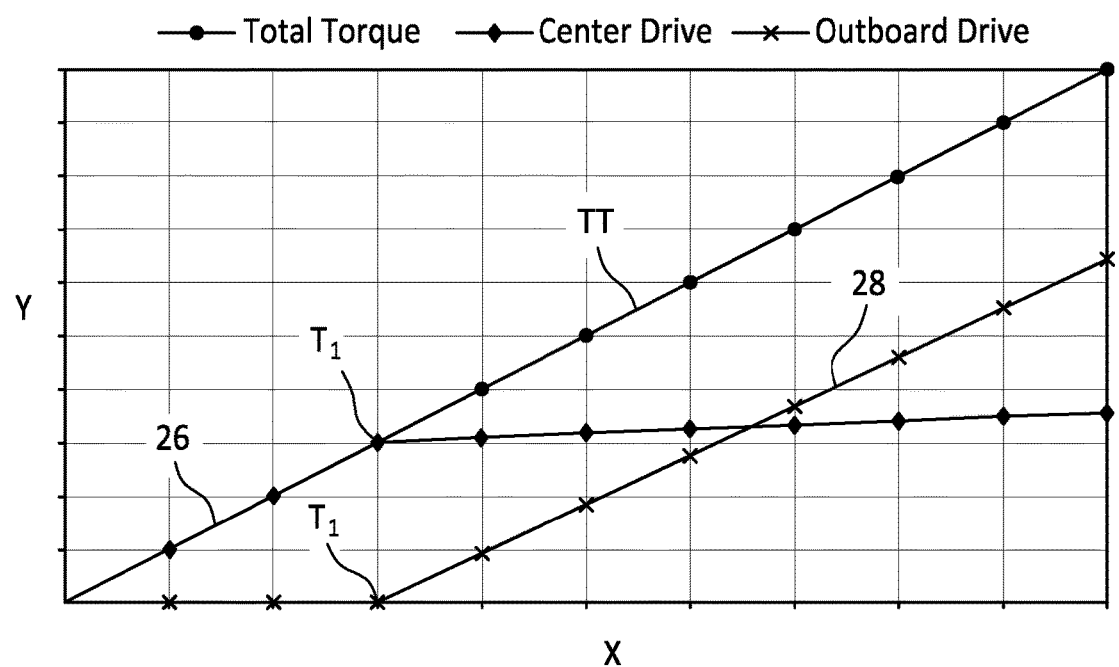
FIG. 17 is a graph of torque v load of the exemplary driver mechanism.
Figure 18:
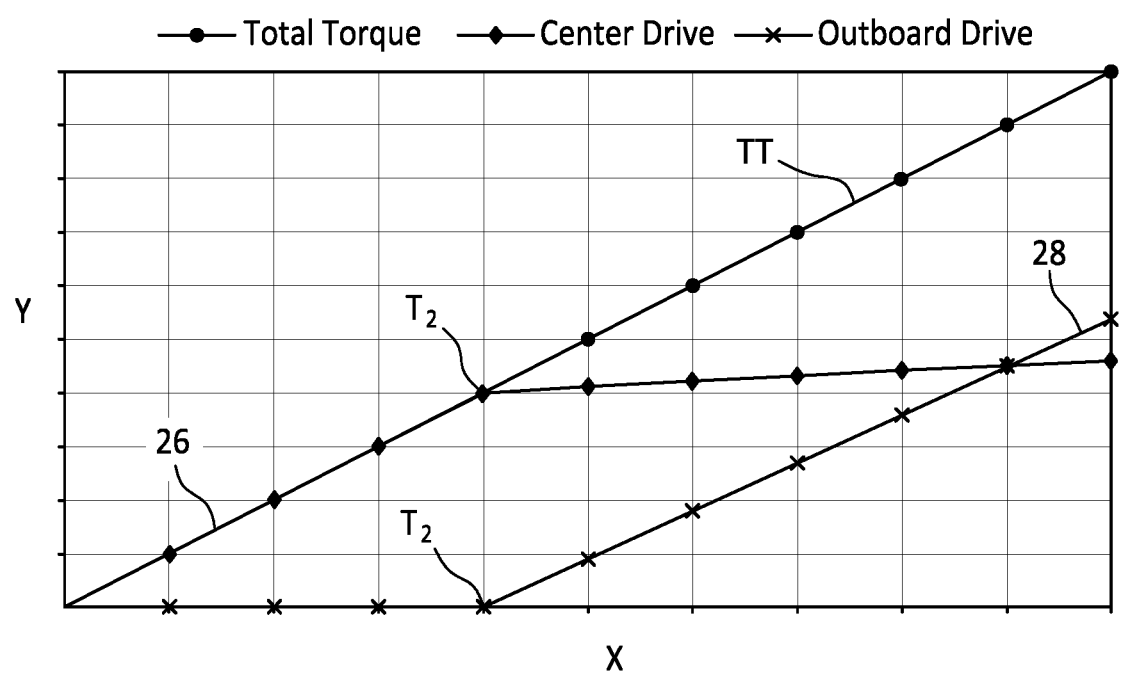
FIG. 18 is a graph of torque v load of the exemplary driver mechanism.

Referring also to FIG. 17 and FIG. 18 diagrams of the sequential torque application system torque split can be seen. At FIG. 17 the torque as a percentage of the full load is shown on the Y axis, the load percentage is shown on the X axis. As described above, as the driver mechanism 12 is engaged with the screw 14 and torque is applied, the initial torque value is applied to the screw 14 through the center drive 26. The outboard drive 28 is not engaged. All applied torque is through the center drive 26. The graph demonstrates the torque value for each drive 26, 28. The torque value of the center drive 26 increases from an initial torque value to the point $T_1$ (subsequent torque value) when the center drive 26 bit 24 deflects. At point $T_1$ the outboard drive 28 engages the screw head 34 receivers 32. As more torque is applied, both the center drive 26 and the outboard drive 28 are engaged and apply torque to the screw head 34. The center drive 26 torque is shown as constant on the graph. The outboard drive 28 torque continues to increase as shown on the graph. The total torque TT is shown to increase on the graph.

FIG. 18 demonstrates that the graph can change by use of a different insertable bit 24. If the insertable bit 24 is changed, perhaps so that deflection of the insertable bit 24 occurs at a relatively higher torque value. So, comparing the graph at FIG. 17 and FIG. 18, the value for torque at point $T_1$ is 30%. FIG. 18 at a point $T_2$ is shown to be 40%. Thus, the use of varying the insertable bit 24 can change the properties of the driver mechanism 12. The torque values can be tailored to match the screw 14 and fastener application.

A technical advantage of the disclosed sequential torque application retention system includes employing sequential torque drive features to apply torque while lowering stress in the head of the screw.

Another technical advantage of the disclosed sequential torque application retention system includes allowing the central drive bit to flex to limit the torque applied by the central drive bit while applying the remaining torque through the outboard drive.

Another technical advantage of the disclosed sequential torque application retention system includes distributing applied torque across multiple drive features.

Another technical advantage of the disclosed sequential torque application retention system includes allowing for the reduction of the thickness of the screw head.

Another technical advantage of the disclosed sequential torque application retention system includes the capacity to reduce the size of the center drive feature and increasing the strength of the screw.

Another technical advantage of the disclosed sequential torque application retention system includes enabling multiple design possibilities for anti-tamper fasteners.

There has been provided a sequential torque application retention system. While the sequential torque application retention system has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A sequential torque application retention system comprising:
   a driver mechanism having a shaft with a shank end and a tip end opposite the shaft end;
   a center drive coupled to the tip end;
   a socket formed in the tip end, said socket configured to receive an insertable bit wherein said insertable bit is employed as the center drive;
   an outboard drive coupled to the tip end;
   a screw including a screw head;
   a central receiver formed in said screw head, said central receiver corresponding to said center drive, said central receiver configured to receive said center drive;

a pair of outboard receivers formed in said screw head corresponding to said outboard drive, said pair of outboard receivers configured to receive said outboard drive;

wherein said center drive is engaged with said screw head at said central receiver responsive to an initial torque and said outboard drive is engaged with said screw head at said pair of outboard receivers responsive to a subsequent torque; and wherein said outboard receivers are positioned so that they do not engage with said outboard drive responsive to the initial torque;

wherein the insertable bit includes a length dimension and a diameter dimension, being determined by a predetermined initial torque value and a predetermined subsequent torque value, such that the insertable bit flexes to limit the torque applied by the central drive bit responsive to the subsequent torque while applying the subsequent torque through the outboard drive.

2. The sequential torque application retention system according to claim 1, wherein the outboard drive is configured as a pair of outboard drives set radially apart and aligned along a common radial axis of the shaft.

3. The sequential torque application retention system according to claim 1, wherein the socket is configured to receive interchangeable insertable bits having predetermined sizes and shapes to be employed with the driver mechanism.

4. The sequential torque application retention system according to claim 1, wherein said insertable bit includes the center drive and the outboard drive.

5. The sequential torque application retention system according to claim 1, wherein said screw head includes two pairs of outboard receivers.

6. A sequential torque application retention system comprising:
    a driver mechanism having a shaft with a hex shank end and a tip end opposite the hex shank end;
    a socket formed in the tip end, said socket configured to receive an insertable bit removably coupled to the socket via a set screw;
    a center drive formed by said insertable bit;
    an outboard drive formed in said tip end; said outboard drive including a pair of outboard drive studs set radially apart and aligned along a common radial axis of the shaft;
    a screw including a screw head;
    a central receiver formed in said screw head, said central receiver corresponding to said center drive, said central receiver configured to receive said center drive;
    a pair of outboard receivers formed in said screw head corresponding to said outboard drive, said pair of outboard receivers configured to receive each of said outboard drive studs;
    wherein said center drive is engaged with said screw head at said central receiver responsive to an initial torque and said outboard drive is engaged with said screw head at said pair of outboard receivers responsive to a subsequent torque; and
    wherein said outboard receivers are positioned so that they do not engage with said outboard drive responsive to the initial torque;
    wherein the insertable bit employed as the center drive includes a length dimension and a diameter dimension, being determined by a predetermined initial torque value and a predetermined subsequent torque value, such that the insertable bit flexes via torsion about the axis of the insertable bit to limit the torque applied by the central drive bit responsive to the subsequent torque while applying the subsequent torque through the outboard drive.

7. The sequential torque application retention system according to claim 6, wherein the socket is configured to receive interchangeable insertable bits having predetermined sizes and shapes to be employed with the driver mechanism.

8. The sequential torque application retention system according to claim 6, wherein said insertable bit includes the center drive and the outboard drive.

9. The sequential torque application retention system according to claim 6, wherein said central receiver is insertable in said screw head.

10. A process for fastening a screw using a sequential torque application retention system of claim 1, the process comprising:
    inserting an insertable bit into a socket formed in the tip end, said socket configured to receive the insertable bit;
    applying an initial torque engaging said center drive with said screw head at said central receiver; and
    applying a subsequent torque engaging said outboard drive with said screw head at said pair of outboard receivers; and
    wherein said outboard drive is not engaged with said screw head at the pair of outboard receivers responsive to the initial torque.

11. The process of claim 10, wherein the outboard drive is configured as a pair of outboard drives set radially apart and aligned along a common radial axis of the shaft.

12. The process of claim 10, wherein the insertable bit is a first insertable bit having a first predetermined size and a first predetermined shape, the process further comprising:
    removing the first insertable bit from the socket and inserting a second insertable bit having a second predetermined size and a second predetermined shape into the socket.

13. The process of claim 10, further comprising:
    configuring the insertable bit interchangeable for predetermined sizes and shapes to be employed with the driver mechanism.

14. The process of claim 10, wherein said insertable bit includes the center drive and the outboard drive.

15. The process of claim 14, further comprising:
    reducing an outside diameter of said screw head while maintaining the outboard receivers.

* * * * *